(12) United States Patent
Martin et al.

(10) Patent No.: US 11,741,863 B2
(45) Date of Patent: Aug. 29, 2023

(54) EYEGLASS-INTEGRATED DISPLAY DEVICE USING MULTIPLE EMBEDDED PROJECTORS AND DISPLAY WINDOWS

(71) Applicant: Tectus Corporation, Saratoga, CA (US)

(72) Inventors: Paul Scott Martin, Palo Alto, CA (US); Brian Elliot Lemoff, Morgan Hill, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 17/574,863

(22) Filed: Jan. 13, 2022

(65) Prior Publication Data

US 2022/0335865 A1 Oct. 20, 2022

Related U.S. Application Data

(60) Provisional application No. 63/176,080, filed on Apr. 16, 2021.

(51) Int. Cl.
*G09G 3/00* (2006.01)
*G06F 3/01* (2006.01)
*G02B 27/01* (2006.01)

(52) U.S. Cl.
CPC ......... *G09G 3/002* (2013.01); *G02B 27/0172* (2013.01); *G02B 27/0176* (2013.01); *G06F 3/013* (2013.01); *G02B 2027/0178* (2013.01); *G09G 2330/026* (2013.01); *G09G 2330/027* (2013.01); *G09G 2354/00* (2013.01)

(58) Field of Classification Search
CPC ............ G02B 27/0176; G02B 27/0172; G02B 2027/0178; G06F 3/013; G06F 3/011–015; G09G 3/002; G09G 2330/027; G09G 2330/026; G09G 2354/00
See application file for complete search history.

(56) References Cited

U.S. PATENT DOCUMENTS

| 10,649,239 B2 | 5/2020 | Kniess | |
| 10,670,808 B1 | 6/2020 | Trail | |
| 2015/0378161 A1 | 12/2015 | Bailey | |
| 2017/0184872 A1* | 6/2017 | Silver | G02C 1/10 |
| 2019/0155035 A1 | 5/2019 | Amitai | |
| 2019/0369417 A1* | 12/2019 | Kniess | G02B 13/16 |

(Continued)

FOREIGN PATENT DOCUMENTS

CA 2247649 C 7/2000

OTHER PUBLICATIONS

International Search Report and Written Opinion for PCT/US22/24505 dated Jun. 29, 2022.

*Primary Examiner* — Hang Lin
(74) *Attorney, Agent, or Firm* — Fenwick & West LLP

(57) ABSTRACT

Advanced display devices are integrated into glasses so that they look and feel more like normal glasses. They are based on pupil replication using multiple, small projectors. A number of projectors are embedded in the eyeglasses, for example embedded in the rim of the eyeglasses or in a periphery of the lens. The projectors generate (partial) images based on a common image to be displayed to the user. These images are optically coupled through the lens, for example using waveguide coupling, to different display windows in the lens. The display windows couple the images out of the lens and towards the user's eye.

21 Claims, 13 Drawing Sheets

(56) References Cited

U.S. PATENT DOCUMENTS

| | | |
|---|---|---|
| 2020/0267359 A1 | 8/2020 | Seiler |
| 2021/0141237 A1 | 5/2021 | Schowengerdt |
| 2021/0255464 A1 | 8/2021 | Hua |
| 2022/0035161 A1* | 2/2022 | Sinay ................. G02B 27/0172 |
| 2022/0299754 A1* | 9/2022 | Collier ............... G02B 27/0172 |

* cited by examiner

EYEGLASS-INTEGRATED DISPLAY DEVICE USING MULTIPLE EMBEDDED PROJECTORS AND DISPLAY WINDOWS

CROSS-REFERENCE TO RELATED APPLICATION(S)

This application claims priority under 35 U.S.C. § 119(e) to U.S. Provisional Patent Application Ser. No. 63/176,080, "Augmented reality glasses based on an array of microdisplays," filed Apr. 16, 2021. The subject matter of all of the foregoing is incorporated herein by reference in its entirety.

BACKGROUND

1. Technical Field

This disclosure relates generally to display devices.

2. Description of Related Art

Glasses are a common sight in today's society and are worn by a large fraction of the world's population, for vision correction as well as for style. With recent innovations in virtual reality/augmented reality (VR/AR) technology, glasses can also be used as a platform for mounting electronic devices capable of performing various functions for the user. For example, in products such as Google Glass, a large and visible projector is mounted on the frame of a pair of glasses. Images from the projector are directed by a small prism (also mounted on the frame) into the user's eye, thus displaying images to the user of the glasses. The projector plus prism can function as a head-up display, allowing the user to view the surrounding environment as well as the projected images simultaneously. This allows the user to view relevant information displayed by the projector while maintaining awareness of the world around him. However, such devices are visibly different from normal eyeglasses, which makes them more intrusive and less desirable for users to wear.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1A:
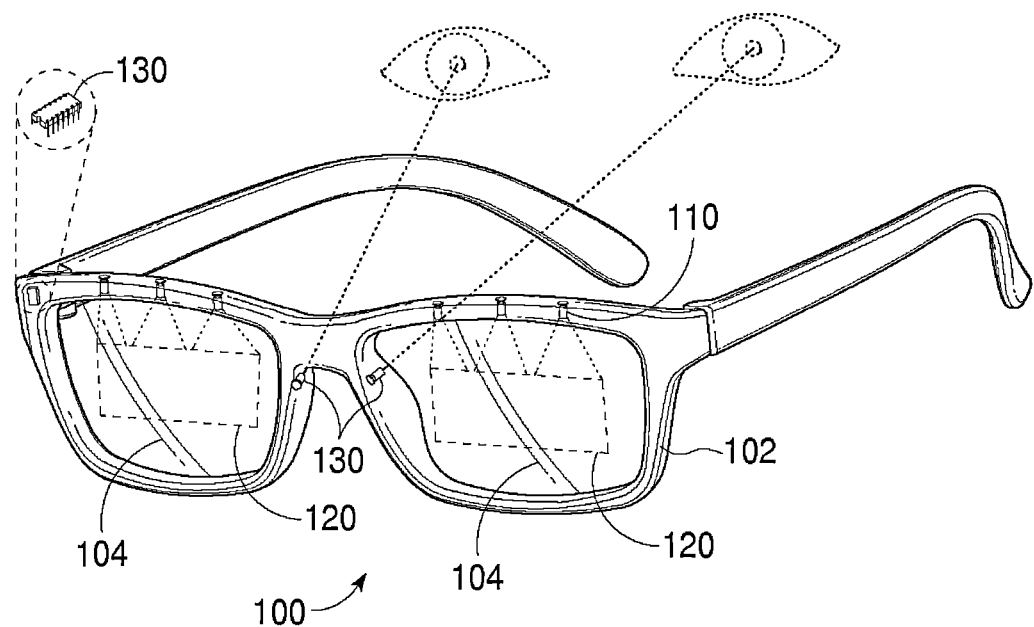
FIG. 1A is a perspective view of an eyeglass-integrated display device that includes arrays of projectors and display windows.

Augmented reality (AR) glasses superimpose electronically generated images on a user's view of the external environment. Unfortunately the full potential of AR glasses has yet to be realized because current models are too big and unfashionable to encourage widespread adoption. Often, the displays contained in the glasses frame are too big and the optical system for relaying images to the user's eye is large and inefficient. This means that the displays are brighter than necessary and use too much electrical power. Excessive power requirements necessitate bulky, heavy batteries.

As described herein, advanced display devices are integrated into glasses so that they look and feel more like normal glasses. These are based on pupil replication using multiple, small projectors. The use of multiple, small projectors also reduces power consumption. A number of projectors are embedded in the eyeglasses, for example embedded in the rim of the eyeglasses or in a periphery of the lens. The projectors generate images that are based on a common image to be displayed to the user by the set of projectors. These images are optically coupled through the lens, for example using waveguide coupling, to different display windows in the lens. The display windows couple the images out of the lens and towards the user's eye. The image projected by a particular projector is visible when the pupil of the user's eye is directed towards the corresponding display window. If the eye position is tracked, projectors may be turned off when the pupil is not directed towards their corresponding display windows.

This approach may be smaller and less obtrusive than conventional approaches for several reasons. As described in more detail below, the projector itself is smaller than more conventional microdisplays. Because the projectors are so small, they may be located and oriented on the eyeglasses so that the use of turning mirrors or other additional optics is reduced or eliminated. In addition, more of these smaller projectors may be used. As a result, for a total given number of display windows, each projector drives fewer display windows. To produce images of a certain brightness from each display window, each projector may have a lower brightness compared to other approaches, because the optical power from a projector is split among a fewer number of display windows.

For example, in a conventional pupil replication approach, a single projector may produce images for a 5×10 array of display windows. The projector producing images for these 50 display windows must produce an output that is 50× as bright as the image viewed from each individual display window. In other words, each individual viewed image is only 2% of the brightness of the projector. In contrast, if 10 projectors are used to drive 5 display windows each, then the required brightness/power for each of these projectors is 10× lower for the same brightness of the viewed image.

This can also reduce the total power consumption, particularly if not all of the projectors are active at once. The reduced size of the batteries and the projectors themselves mean that the glasses can be made to look like regular glasses and thereby not arouse undue curiosity in casual observers.

FIG. 1A is a perspective view of an eyeglass-integrated display device 100 that includes multiples projectors and display windows. The eyeglasses 100 includes a frame 102, and a pair of lenses 104 mounted within the frame. The eyeglasses 100 further includes multiple projectors 110 embedded in the eyeglasses. In FIG. 1A, the projectors 110 are embedded in the frame 102, specifically in the rim bordering the lenses. In other embodiments, the projectors 110 may embedded within the lens(es) 104. Different projectors may be embedded in different parts of the eyeglasses. The projectors 110 are small and, in some designs, they are integrated into the eyeglasses so that they are not visible to an outside observer when the glasses are worn by the user.

Each projector 110 includes an image source and an optical system. They are positioned so that the projectors optically couple into the lens(es) 104. For example, in FIG. 1A, the projectors 110 project images directly into the lenses 104 through the edge of the lens without the use of a turning mirror. In this geometry, each projector 110 may be short enough that it does not protrude beyond the exterior edge of the eyeglass rim, thus adding to the unobtrusiveness of the display device. In some embodiments, the projectors 110 project light of a particular wavelength range (e.g., a monochrome image). In other embodiments, the projectors 110 project light of different wavelengths (e.g., wavelengths corresponding to an RGB color space for a color image).

The eyeglass-integrated display device also includes display windows 120, which are optical devices that direct the light from the projectors 110 out of the lenses 104 and toward the user's eye. For example, the display windows may be mirrors or partial mirrors, volume holographic gratings, surface relief gratings, or polarization volume gratings. For convenience, the individual display windows are not shown in FIG. 1A. Rather, the rectangles 120 indicate the general location of the individual display windows. Each projector 110 drives at least two display windows 120, meaning that the image from each projector 110 is split between and redirected by at least two display windows 120 towards the user's eye. The images generated by the projectors 110 are also part of a common image and may be the same image in some cases. Since the projectors 110 work together to display a common image and since the display windows 120 are at different locations in the lens 104, the common image from the projectors 110 is replicated to these different locations, as described in more detail below.

Different pairs of eyeglasses 100 may contain different numbers and locations of projectors 110, different numbers and locations of display windows 120, and different configurations of which projectors drive which and how many display windows 120. For example, in some embodiments, each lens 104 may contain two or more embedded projectors 110 at corresponding left and right locations of the lenses. The display windows 120 may be arranged as a rectangular array or some other regular (or non-regular) two-dimensional pattern. In FIG. 1A, the projectors 110 are located along a top of the rim, and each projector is optically coupled to a vertical row of display windows 120. As an alternative, the projectors 110 may be embedded in the lens 104 rather than the frame 102, with the projectors projecting images directly through the lenses 104 to the display windows 120 without the use of a turning mirror. The projectors 110 may be small enough that they do not protrude beyond the front or back surface of the lens, so that the lens remains smooth.

The eyeglasses 100 may further include additional circuitry 130 such as a controller for providing power and data to the projector 110. The display device may be powered by wireless power transfer and/or battery. Data may be received via a separate signal, such as a radio frequency (RF) signal, ultrasonic data transmission signal, or a Bluetooth signal. In some embodiments, additional circuitry 130 is embedded within the material of the frame 102. In other embodiments, the circuitry 130 is attached to a surface of the frame 102 or on or within the lenses 104. In FIG. 1A, the integrated circuit 130 embedded in the upper temple-side corner of the frame is a controller. The circuitry 130 near the nose bridge are eye-tracking sensors, as denoted by the dashed lines leading to the eyes.

A controller in the eyeglasses controls the operation of the projectors 110. For example, the controller may control what image data is provided to the projectors 110 for display. In some embodiments, the image data is received directly by the projectors 110. In some embodiments, the controller may be internal to the projectors 110 or is coupled directly to the projectors.

The controller may be in communication with one or more sensors (not shown) attached to the frame 102 and/or one or more external sensors. For example, the controller may receive data from an ambient light sensor attached to the frame 102, and may adjust the brightness or intensity of the images produced by the projectors 110 based upon the received ambient light data. Other sensors may include camera, inertial sensor (e.g., accelerometer, gyroscope or inertial measurement unit), magnetometer, and sensors used for eye tracking.

Figure 1B:
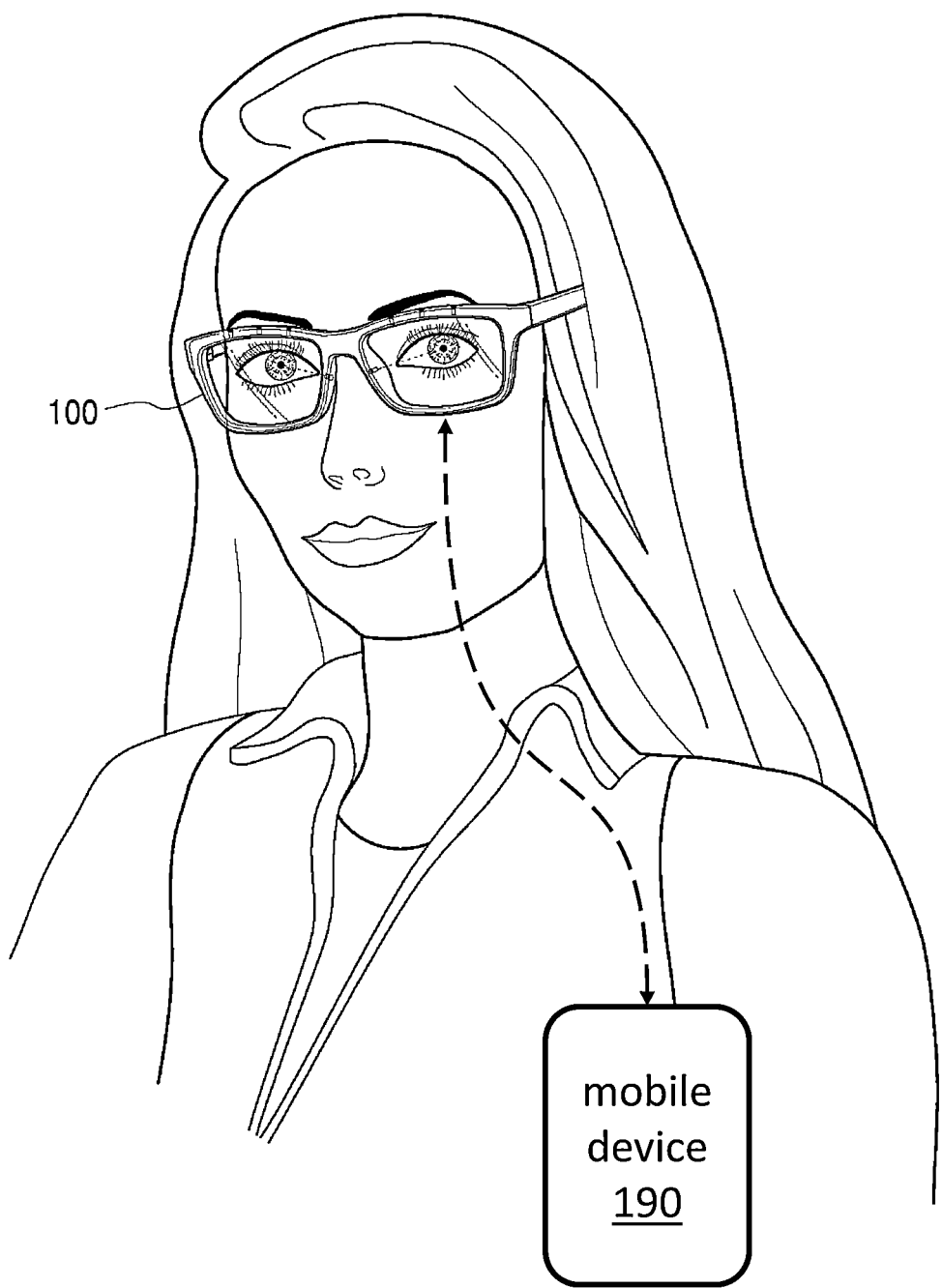
FIG. 1B shows an eyeglass-integrated display device being worn by a user.

FIG. 1B shows an eyeglass-integrated display 100 being worn by a user. As shown in FIG. 1B, the user wears the eyeglasses 100 in the same way as they would wear a pair of conventional (i.e., non-electronic) eyeglasses. As discussed above, the eyeglasses 100 include projectors that project images onto a retina of the user. In the example of FIG. 1B, a mobile device 190 (for example, a smartphone, laptop, tablet, and/or any other type of electronic device containing a processor) generates image data and/or control data, and transmits the data to the eyeglasses 100 to control the operation of the projectors. The circuitry on the eyeglasses 100 could connect directly to the mobile devices 190 using Bluetooth or other communications links. In some embodiments, the user, in addition to wearing the electronic eyeglasses 100, also wears a necklace or other auxiliary device. The auxiliary device may include one or more electronic components arranged on or within its structure. The mobile device 190 may communicate to the eyeglasses 100 via the auxiliary device.

Figure 2A:
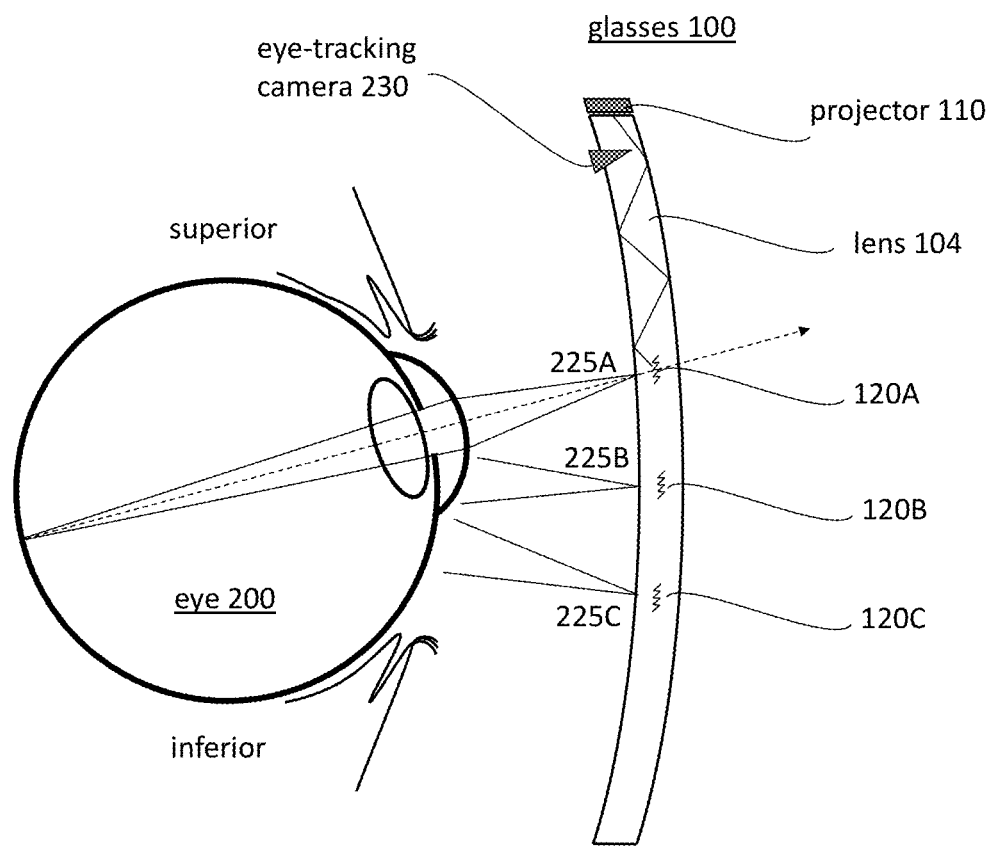
FIG. 2A is a side cross-sectional view of an eye looking through glasses.
Figure 2B:
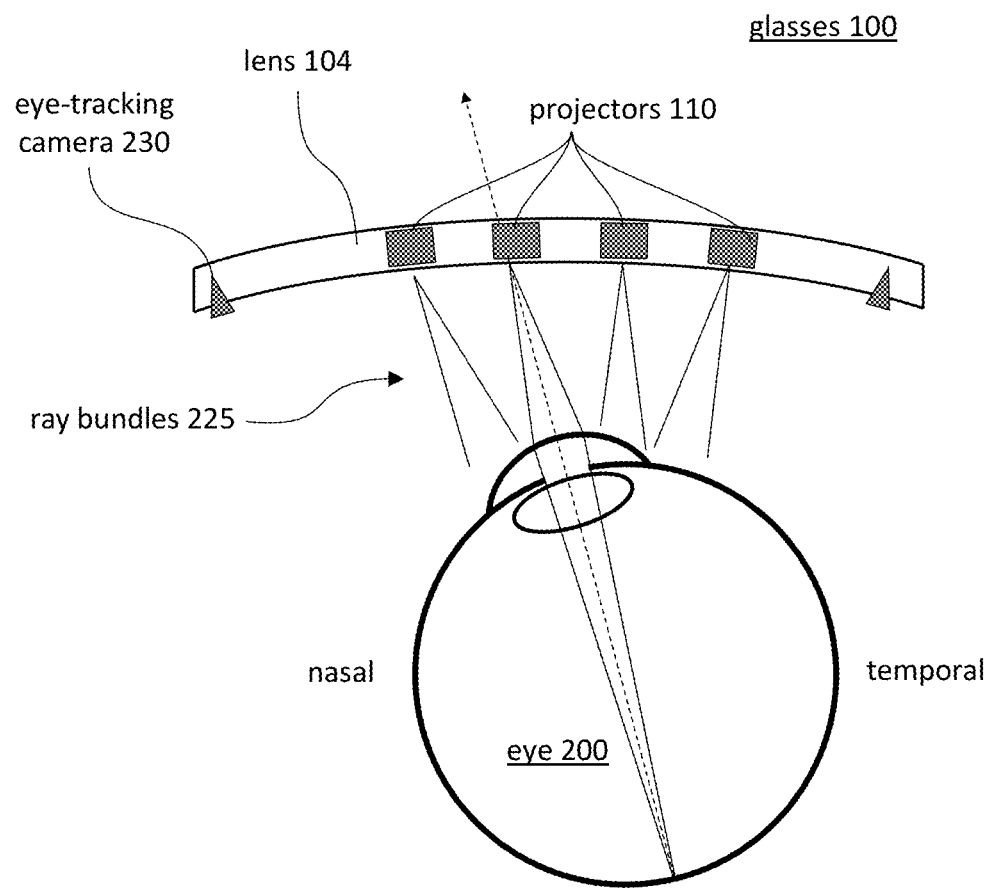
FIG. 2B is a top cross-sectional view of an eye looking through glasses.
Figure 2C:
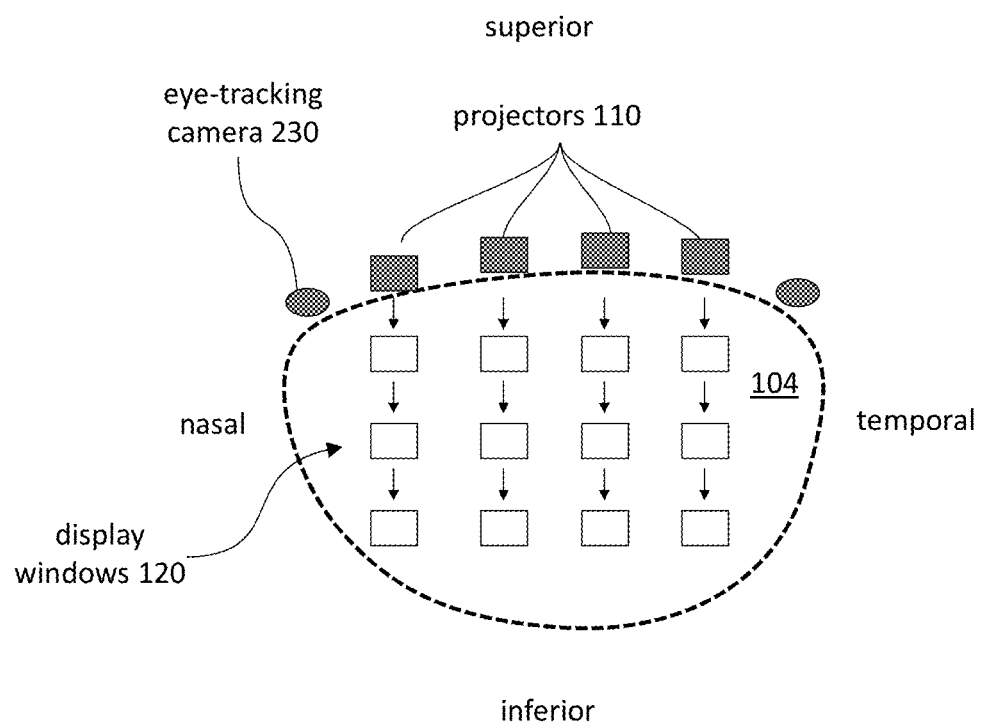
FIG. 2C shows the arrangement of projectors and display windows in one of the lenses.

FIGS. 2A and 2B are a side cross-sectional view and a top cross-sectional view of an eye 200 looking through glasses 100. FIG. 2C shows the arrangement of projectors 110 and display windows 120 for one of the lenses 104. In these figures, the directions superior (up) and inferior (down) are labelled, as are the directions nasal (towards the nose) and temporal (away from the nose). The superior/inferior directions are referred to as the vertical dimension, and the nasal/temporal directions as the lateral dimension.

This particular example shows a row of four projectors 110 embedded in the rim of the glasses. Each projector 110 drives a column of three display windows 120 embedded in the lens 104 for a total of 12 display windows, as shown in FIG. 2C. In one approach, all of the projectors 110 produce the same image, which is replicated in its entirety at each of the display windows. In the side view of FIG. 2A, only one column of projector 110 and corresponding display windows 120A-C is shown. The projector 110 produces the same image as the other projectors, and this common image is coupled into the lens 104. Lens 104 acts as a waveguide to direct the light to the display windows 120. Each display window 120A-C reproduces the common image by redirecting some of the light towards the eye, as shown by the corresponding ray bundles 225A-C. In FIG. 2A, the eye 220 is looking towards display window 120A, so the ray bundle 225A redirected by display window 120A is projected through the eye's aperture and imaged onto the retina.

The display windows 120 in FIG. 2C do not occupy all of the area of lens 104, and they may also be semi-transparent. Therefore, the user can also see through the lens 104 to view the external environment. The projected image will be superimposed on the user's view of the environment.

FIG. 2B shows an analogous situation as FIG. 2A. Each projector 110 optically couples to a column of display windows, which are not visible in FIG. 2B since this is a top view. Each display window redirects a portion of the incoming image as a ray bundle 225. The projectors 110 each reproduce the common image. Thus, the eye 200 sees the common image as it rotates right and left between the different columns of display windows.

In an alternate approach, different display windows 120 may redirect less than the entire common image. For example, display windows may be positioned so that less than the entire common image would be visible when the user is looking towards the display window. In that case, only the visible portion of the common image may be displayed by the display window. In FIG. 2A, the eye 220 is looking up towards the display window 225A. When the user is looking up, the bottom part of the common image may not fall within the user's field of view and so only the top part of the common image may be redirected by the display window 225A. Similarly, when the user is looking down at display window 225C, only the bottom part of the common image may be redirected by the display window 225C. The same applies when the user looks to the right or left. In FIG. 2B, when the user looks to the left towards display windows fed by the left projector, the user may be looking only at the left portion of the common image. In that case, the image produced by the left projector might include only the left portion of the common image, and not the entire common image.

Regardless of which approach is taken, the aggregate effect of all of the display windows 120 is that the user will view the entire common image produced by the projectors 110 as the eye 200 looks in different directions.

In the example of FIG. 2, the eyeglasses 100 also includes eye-tracking cameras 230. These cameras 230 are also embedded in the eyeglasses, so as to be unobtrusive. They capture images of the eye 200 as the eye rotates. These images may be used to determine the gaze direction of the eye, which in turn may be used to turn projectors 110 on and off to conserve power. For example, in FIG. 2B, the leftmost projector and the two right projectors may be turned off, because only the second leftmost projector produces a ray bundle that enters the eye. The other ray bundles would be vignetted by the eye's iris. Eye tracking may be implemented in other ways.

Figure 3:
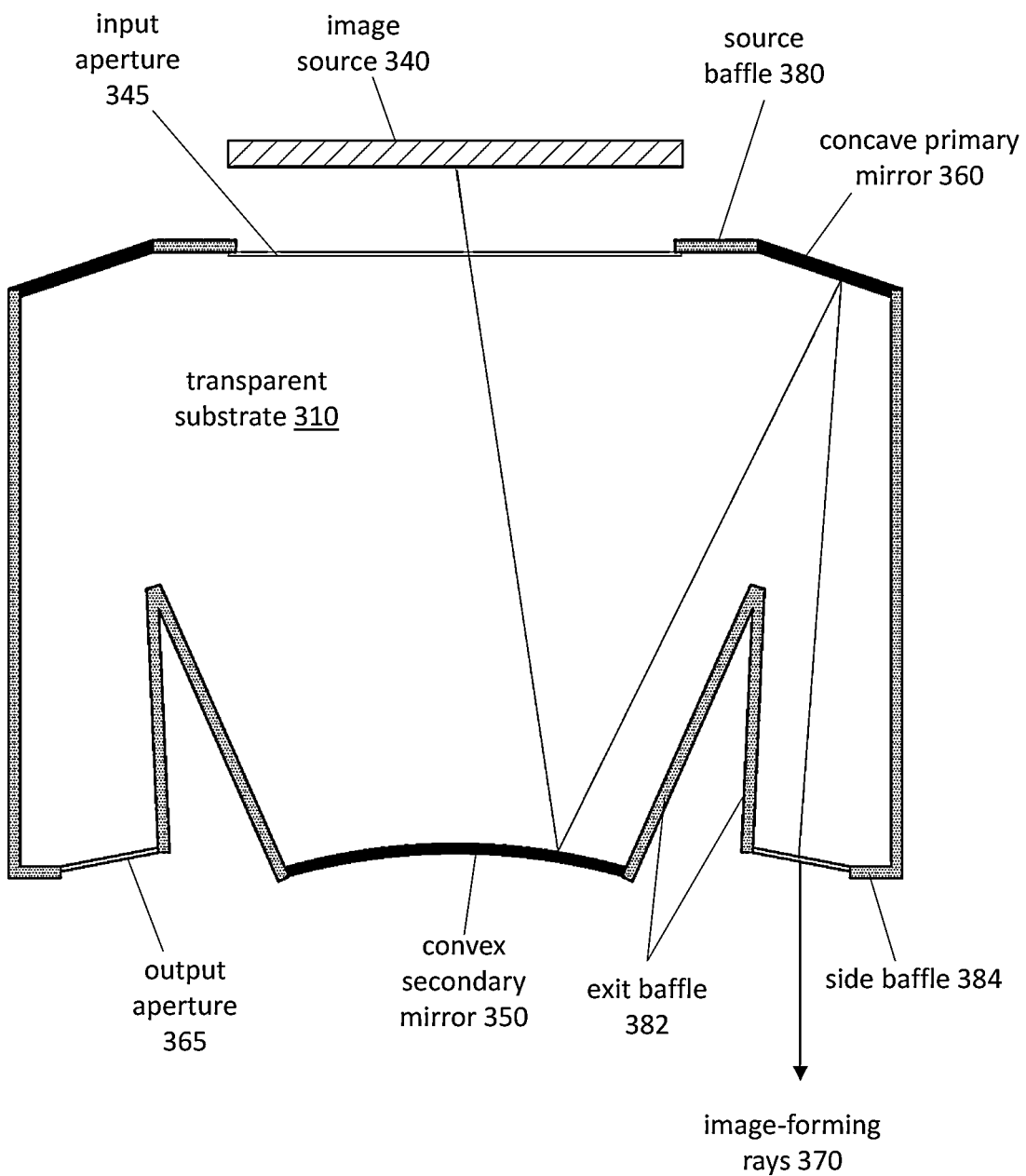
FIG. 3 is a cross-sectional view of a projector suitable for use in the eyeglasses described herein.

FIG. 3 is a cross-sectional view of a projector 300 that may be made small enough to be suitable for use in the eyeglasses described herein. Projector 300 includes an image source 340 and optics to project the images from the image source onto the user's retina. The optics are based on a solid, transparent substrate 310. The solid transparent substrate 310 may be made from plastic, glass or other transparent materials. The imaging optics includes a convex secondary mirror 350 and a concave primary mirror 360. Either or both of these may be aspheric. The image source 340 may have a rectangular or hexagonal active area (e.g., LED array). The optics and transparent substrate 310 may be circularly symmetric around an optical axis.

The two mirrors 350, 360 may be formed by coating opposite ends of the substrate 310 with a reflective material such as a metal (e.g. aluminum or silver) or an engineered stack of dielectric layers. The shape of the mirrors 350, 360 may be made by any of several different techniques. For example, if the substrate is injection-molded plastic, then the shape of the mirrors follows the shape of the mold used. Alternatively, the shape of the mirrors may be made by diamond turning the substrate on a lathe. Alternatively, the shape of the mirrors may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed.

The primary mirror 360 includes a center clear input aperture 345. The image source 340, such as an LED (light emitting diode) display chip with an array of individually addressable emitters, produces light that enters the substrate 310 through this aperture 345. Alternate image sources include illuminated photomasks or single light emitting diodes, as examples.

The secondary mirror 350 faces the image source 340, and the primary mirror 360 faces the secondary mirror 350. Light rays from the image source 340 are first incident on and reflected by the convex secondary mirror 350. The reflected rays are then incident on and further reflected by the primary mirror 360 before exiting the optical system. The primary mirror 360 is referred to as "primary" because it is larger than the secondary mirror 350, even though light from the image source 340 strikes the secondary mirror 350 before the primary mirror 360. Although the secondary mirror 350 in FIG. 3 is drawn smaller than the input aperture 345, it need not be.

The secondary mirror 350 and primary mirror 360 cooperate to project the image from the image source 340 through the output aperture 365 and then into the lens of the eyeglass for eventual imaging on the user's retina. However, not all light rays from the image source 340 may be successfully projected as part of image formation. Those light rays that are successfully projected to form an image are referred to as image-forming rays 370. The remaining light rays from the image source 340 are referred to as stray rays. Accordingly, the projector 300 also includes a light baffle system to block or at least reduce the stray rays that reach the exit aperture and/or to direct exiting stray rays to areas away from the projected image.

In FIG. 3, the baffle system includes three baffle structures: a source baffle 380, an exit baffle 382 and a side baffle 384. The source baffle 380 is a flat, annular structure, which may be made by coating the substrate 310 with an absorbing material. The exit baffle 382 has three-dimensional structure. It may be made by forming grooves in the substrate 310 and then coating the grooves. The side baffle 384 is the coated sidewall of the substrate 310. For the different baffles, an absorbing material such as carbon, roughened or etched nickel ("nickel black"), black chrome, or Vantablack (Surrey NanoSystems, Newhaven, UK) may be used. Other baffle structures may also be used. For example, the source baffle 380 may be based on grooves, the exit baffle 382 may be a flat structure, and the side baffle 384 may be part of a cavity that contains the substrate 310 (rather than part of the substrate 310).

Figure 4A:
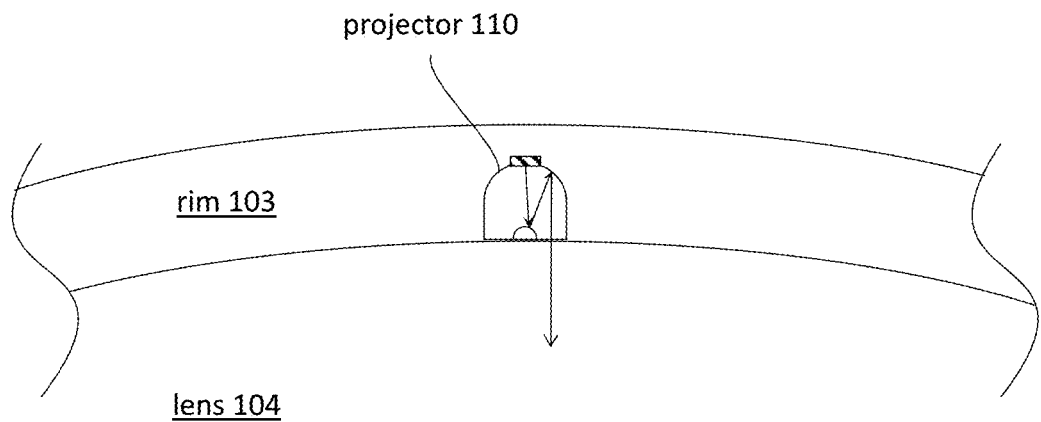
FIGS. 4A and 4B are front and side cross-sectional views showing coupling of a projector into a lens.
Figure 4B:
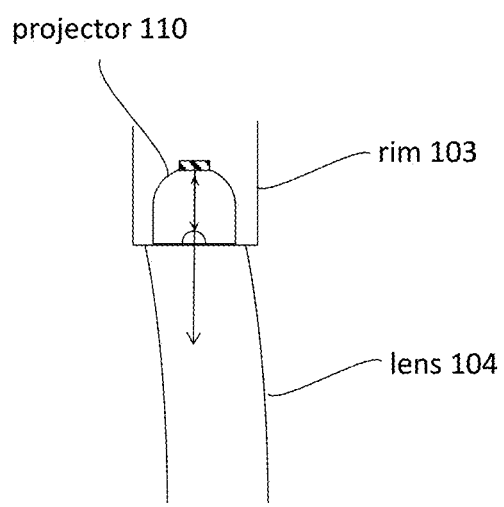
Figure 5:
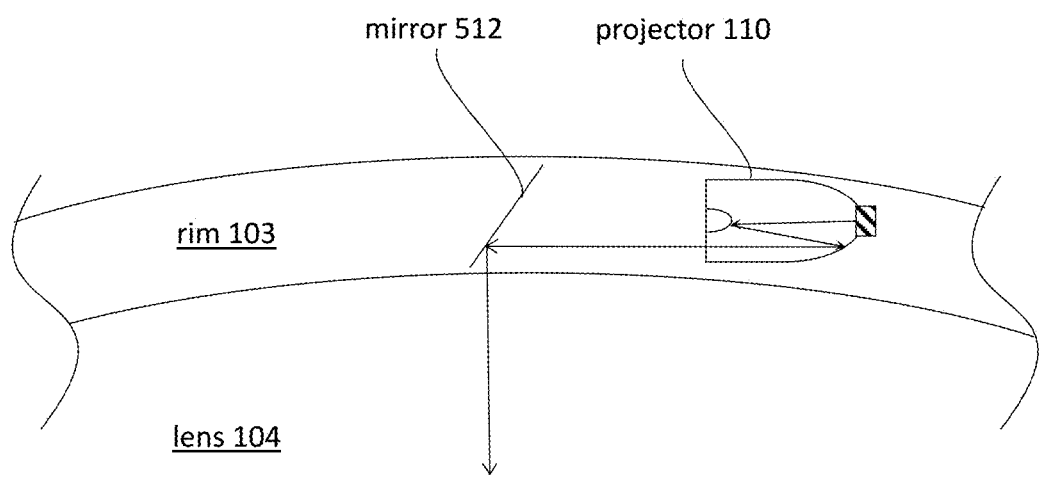
FIG. 5 is a front cross-sectional view showing a different coupling of a projector into a lens.

FIGS. 4-5 show different arrangements of projectors embedded in the frame and their coupling into the lens of the eyeglass. FIGS. 4A and 4B are front and side cross-sectional views of one configuration, where the projector 110 is butt-coupled directly into the lens 104. The front view FIG. 4A is the same view as shown in FIG. 2C, but magnified to show the rim/lens interface. The projector 110 is embedded in the rim 103 of the eyeglasses, with the output aperture of the projector (e.g., bottom surface of the projector design in FIG. 3) in close proximity to the interface between the rim 103 and lens 104. Imaging-forming rays exit the projector 110 and enter the lens 104 directly without any redirection.

In the design of FIG. 4, the projector 110 is small enough to fit into the rim 103, although it may protrude beyond the rim in some designs. In order to fit into the top edge of the rim 103 in the configuration of FIG. 4, the length of the projector 110 (up-down direction in FIG. 4A) is constrained to be less than the vertical height of the rim, and the width of the projector 110 along the direction perpendicular to the lens (left-right direction in FIG. 4B) is constrained to be less than the thickness of the rim. The width of the projector 110 in the laterial direction (left-right direction in FIG. 4A) may be larger. The projector design shown in FIG. 3 may be built with dimensions 3 mm×3 mm×3 mm, or even 2 mm×2 mm×2 mm or smaller.

Some areas of the rim, such as the corners, may be larger and provide more volume to embed projectors. Some rim designs are also thicker or broader than others, and may provide more volume.

FIG. 5 shows an example with a projector 110 that is long relative to the height of the rim 103. Rather than protruding beyond the top of the rim, the projector 110 is rotated within the rim, and a mirror 512 redirects the light from projector 110 into the lens 104.

Figure 6A:
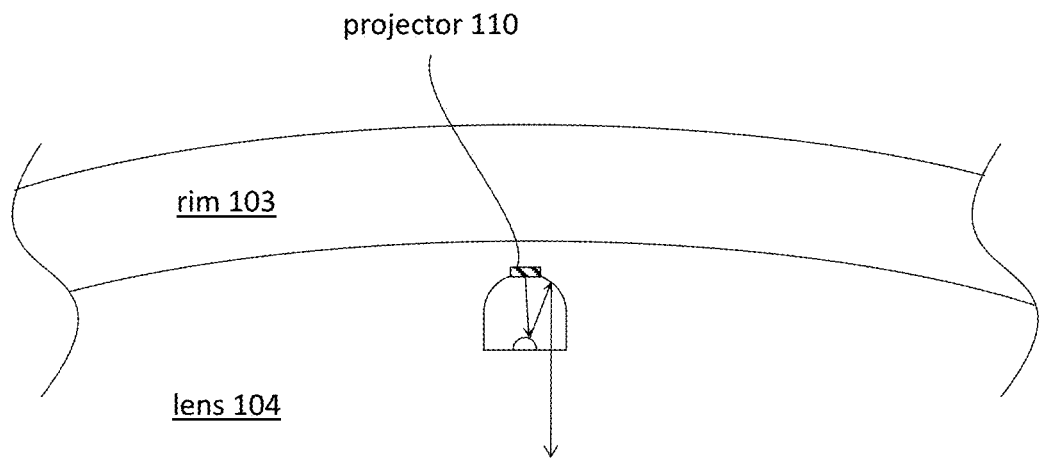
FIGS. 6A and 6B are front and side cross-sectional views showing a projector embedded in a lens.
Figure 6B:
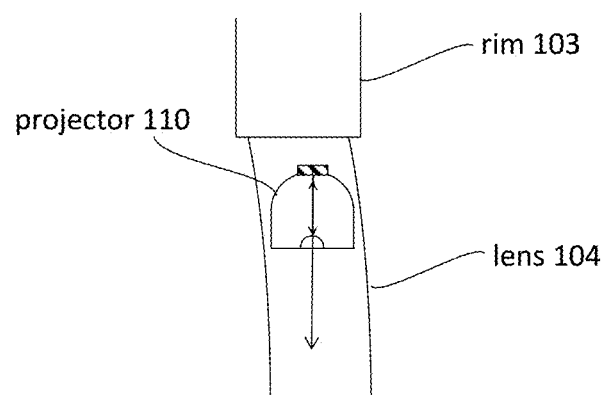

FIGS. 6A and 6B are similar to FIGS. 4A and 4B, except the projector 110 is embedded in the lens 104 itself rather than in the rim 103. Image-forming rays that exit projector 110 are coupled directly into the lens 104.

FIGS. 7-10 concern the arrangement of display windows on the lens. FIGS. 7A-7D illustrate some principles of pupil replication using display windows. These are illustrated in one dimension for convenience, but the principles also apply to two dimensions. FIG. 7A shows a cross-sectional view of lens 104, which contains display windows 720A-E. The display windows are driven by a single projector. The user's eye is represented by the pupil opening 702, which rotates around the eye's center of rotation 705. Optical axis 707 is the forward looking gaze direction. That is, when the user is looking straight ahead, then the center of the user's field of view lies along optical axis 707. The image 709 being projected is represented by three points 709w,x, y. When projected onto the user's retina, the 709x point appears to lie on the optical axis 707, and the 709w and 709y points lie to either side of the optical axis. The projector (not shown) generates the image 709, and each display window directs some or all of the image towards the user's eye to produce the appearance of image 709 overlaid on the external environment.

Figure 7A:
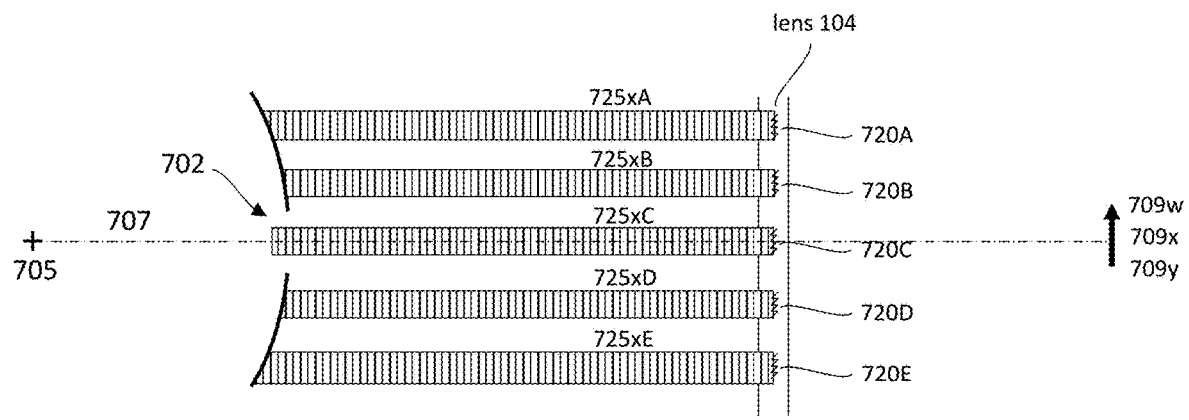
FIGS. 7A-7D illustrate pupil replication using display windows.

FIG. 7A shows the formation of point 709x. Point 709x will appear as ray bundles 725x propagating parallel to the optical axis 707. Assume that each display window 720A-E produces a corresponding ray bundle 725xA-E, and the spatial extent of each ray bundle 725x is determined by the aperture of the corresponding display window 720. The display windows 720 are sized and spaced so that as the eye rotates, some light from ray bundles 725x enter the eye through the pupil 702. In FIG. 7A, the user is looking straight ahead, and light from ray bundle 725xC enters the pupil 702 and forms the image of point 709x.

Figure 7B:
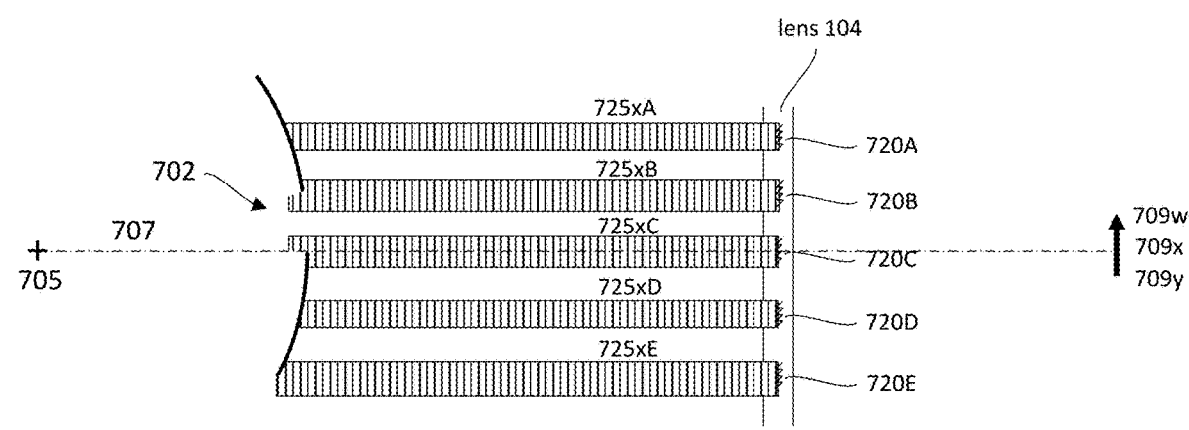

In FIG. 7B, the user is looking off to one direction, and light from ray bundles 725xB and 725xC enter the pupil 702 and forms the image of point 709x. The display windows 720 may be sized and spaced so that the amount of light entering through pupil 702 is constant as the user's eye rotates. Alternatively, the eye rotation may be tracked and power of the projected images may be adjusted so that a constant amount of light enters through pupil 702. Eye tracking may also be used to conserve power. In FIG. 7B, if the display windows were driven by different projectors, then the projectors for display windows 720A,D,E may be turned off with respect to point 709x since ray bundles 725xA,D,E do not enter the user's eye.

Figure 7C:
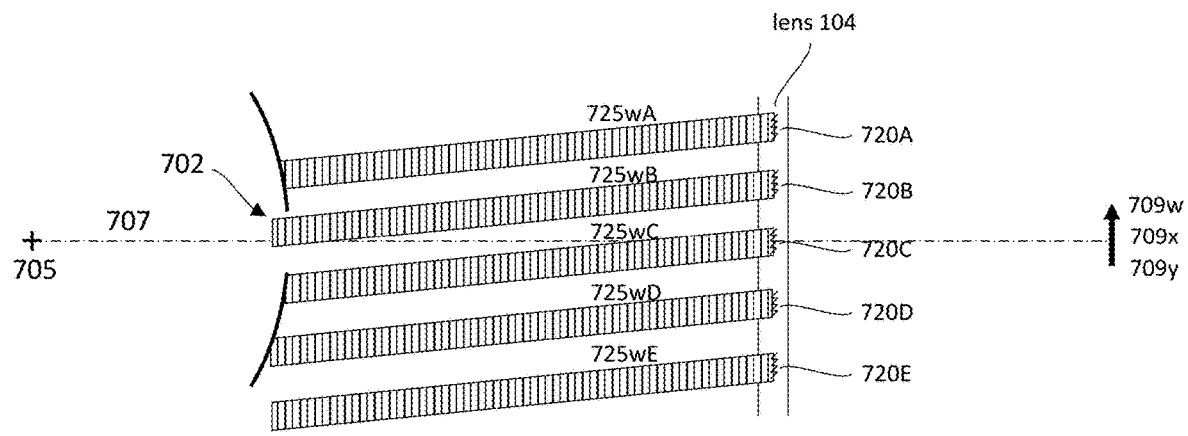
Figure 7D:
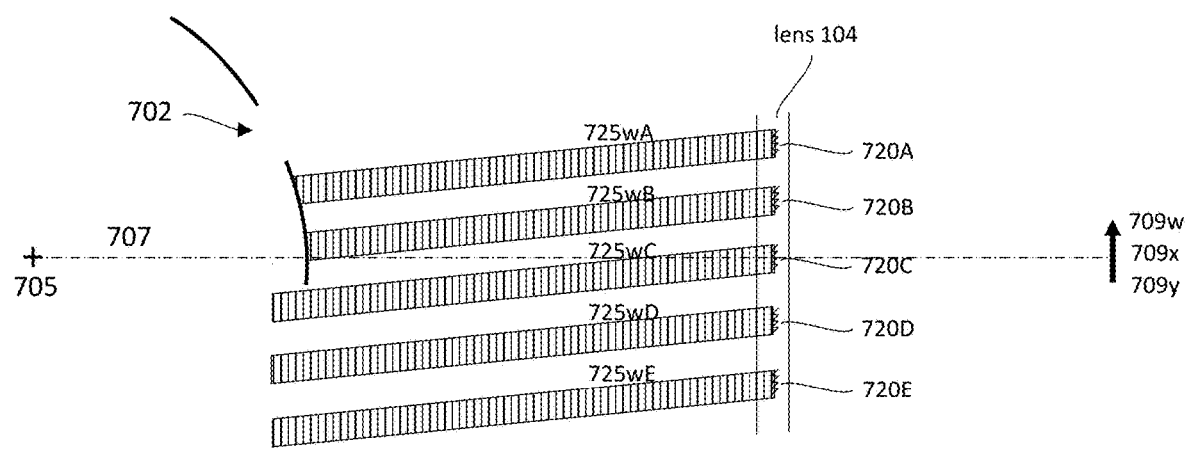

FIG. 7C shows the formation of point 709w. Point 709w will appear as ray bundles 725w propagating at an angle relative to the optical axis 707. In FIG. 7C, the user is looking straight ahead, light from some of the ray bundles 725w enter through the pupil 702 and the user "sees" point 709w. In FIG. 7D, the user is looking far off to one direction. In that case, point 709w will be in the user's periphery and possible outside the user's field of view. In such situations, it may not be necessary or desirable to display point 709w, so the corresponding projectors may be turned off and/or the display windows may be designed not to redirect that portion of the image.

Figure 8:
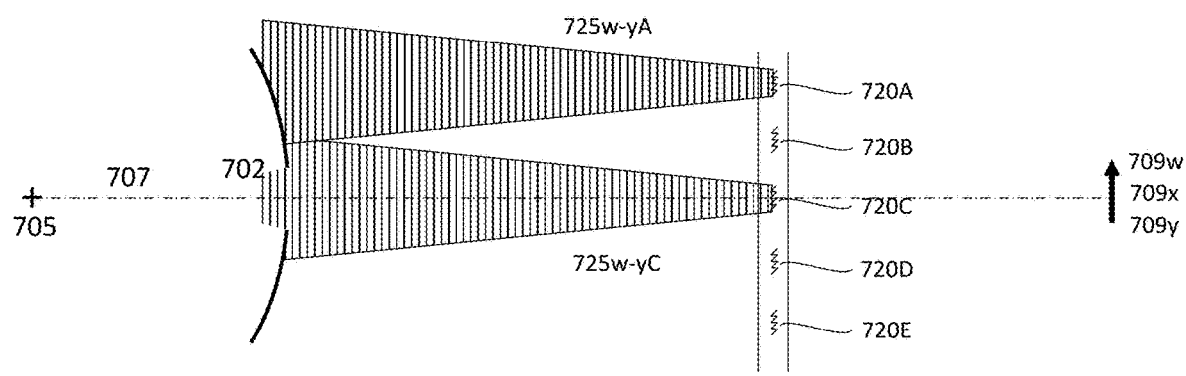
FIG. 8 shows a configuration where different display windows project the same images.
Figure 9:
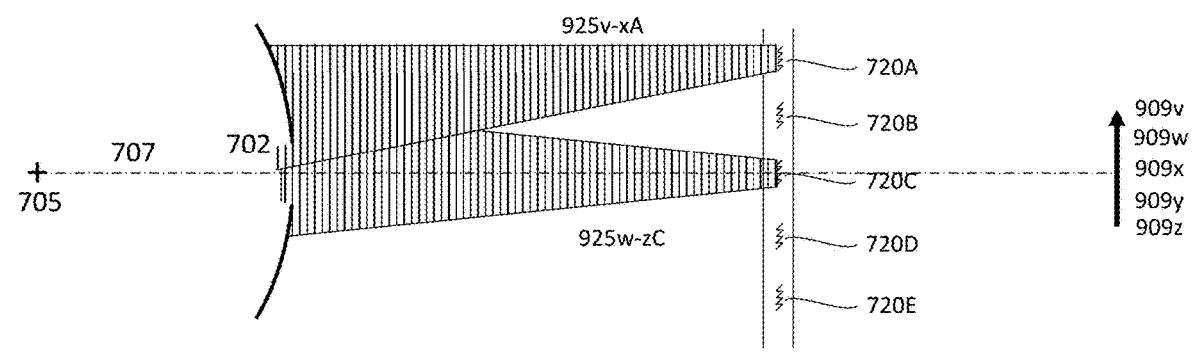
FIG. 9 shows a configuration where different display windows project different portions of a common image.

FIG. 7 considers what ray bundles 725 are produced in order to project different image points 709 onto the user's retina. FIGS. 8-9 consider the set of ray bundles produced by each display window 720, given all of the image points. In FIG. 8, the display window 720C produces ray bundles 725w-yC in order to project the image points 709w-y. The same is true for the other display windows 720. Each display window 720 produces the same set of ray bundles 725w-y. For clarity, only the ray bundles 725w-yA for display window 720A are shown.

In some cases, it may be desirable for different display windows to produce different sets of ray bundles, representing different parts of the overall image. In FIG. 9, image 909 is extended to include additional points 909v and 909z. The center display window 920C produces a set of ray bundles ranging from 925w-yC corresponding to image points 909w-y, which is the same as in FIG. 8 However, the edge display window 920A may produce a set of ray bundles ranging from 925v-x corresponding to image points 909v-x, and the other edge display window 920E may produce a set of ray bundles ranging from 925x-z corresponding to image points 909x-z. In FIG. 9, each of the display windows 920 may be driven by different projectors, with each projector producing a different portion of the full image.

In FIG. 9, if the user looks in the direction of display window 720A, they will not see image points 909y,z. The eye box is the range of rotation of the eye for which the projected image can still be seen. In FIG. 8, assuming that the display windows span the entire range of motion of the user's eye, the display device will fill a fairly large eye box. The user can always see the image no matter where they are looking. If the display windows in FIG. 8 spanned less than the entire range of eye motion, then the eye box for the display device will be smaller. In some cases, the device may be designed to fill an eye box that occupies only the center of the user's field of view. Then, the user will see the image only when looking within some vicinity of straight ahead. Alternatively, the device may be designed to fill an eye box located in a peripheral region of the user's visual field. If only the right peripheral region is filled, then the user will see the projected image only when looking to the right.

Figure 10A:
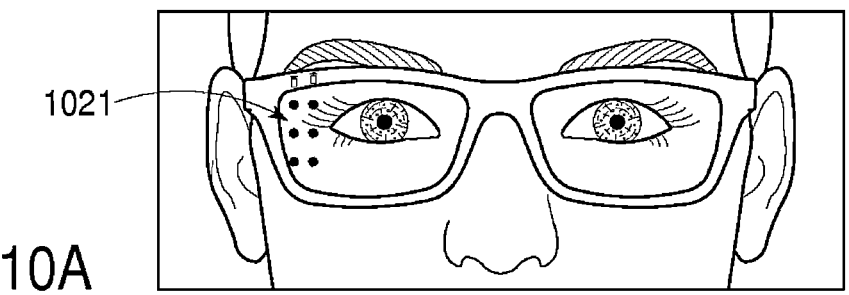
FIGS. 10A-10D show different arrangements of display windows.

FIGS. 10A-10D show different arrangements of display windows and projectors. FIG. 10A shows a 3×2 two-dimensional array of display windows 1021. There may be two projectors that each drives a column of three display windows. Alternatively, there could be three projectors that each drive a row of two display windows. Other embodiments may use different arrangements of two dimensional arrays of display windows or even display windows not arranged in two-dimensional arrays. The projectors and display windows are coordinated to display a common image, which is visible when the user looks to the right.

Figure 10B:
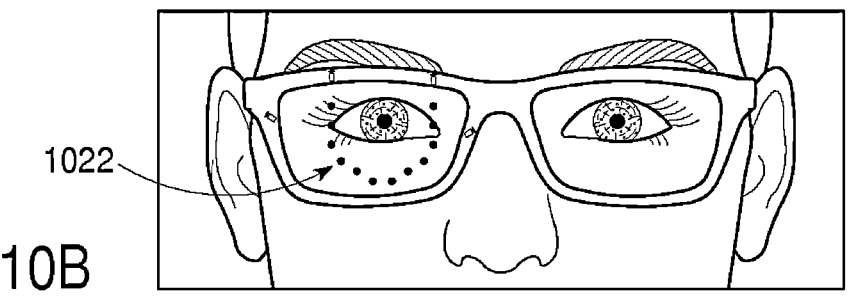

In FIG. 10B, four rows of display windows 1022 are arranged around the user's peripheral vision. Each row is driven by a different projector. The common image displayed by these windows is visible in the user's periphery.

Figure 10C:
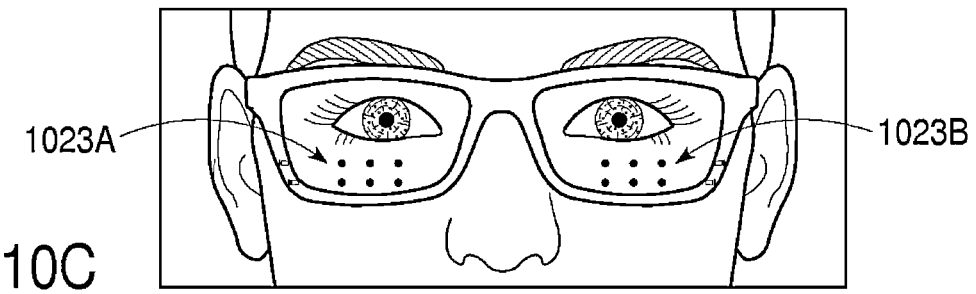
Figure 10D:
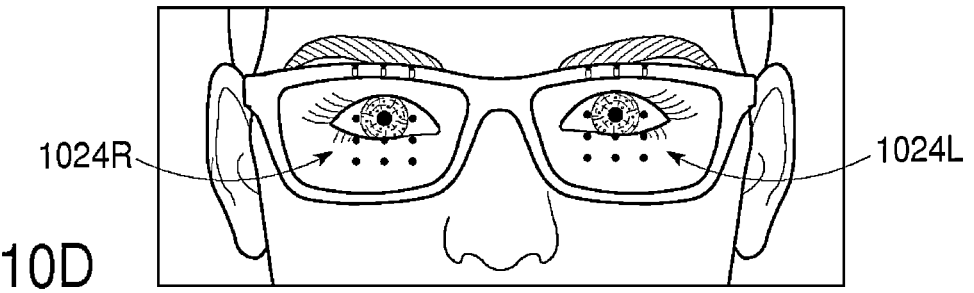

In FIG. 10C, there are two arrays 1023A,B of display windows, one on each lens. In this example, the two arrays display different images. The image from array 1023A is visible when the user looks down and to the right, and the image from array 1023B is visible when the user looks down and to the left. In FIG. 10D, there are also two arrays 1024L,R of display windows, one on each lens. Here, the two arrays display left eye and right eye versions of the same image to produce a stereoscopic image. Other types of three-dimensional images may be produced by sending different images to the left and right eyes.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An eyeglass-integrated display device comprising:
eyeglasses comprising an eyeglasses frame, and lenses mounted in the eyeglasses frame;
at least two projectors embedded in the eyeglasses; and
at least four display windows positioned at different locations in the superior/inferior and nasal/temporal dimensions in one of the lenses, wherein each of at least two of the projectors is optically coupled through the lens to only a single row of at least two of the display windows, each projector generates an image that is a portion of a common image and the display windows direct the images from the projectors towards a user's eye, and the projectors are powered on and off based on eye tracking of the user's eye.

2. The device of claim 1 wherein the eyeglasses frame comprises a rim, and at least one of the projectors is embedded in the rim.

3. The device of claim 2 wherein the projector located along the rim projects images directly into the lens and towards the display windows through an edge of the lens without any turning mirror.

4. The device of claim 2 wherein the projector located along the rim does not protrude beyond an exterior edge of the rim.

5. The device of claim 1 wherein at least one of the projectors is embedded in the lens.

6. The device of claim 5 wherein the projector located in the lens projects images directly into the lens and towards the display windows without any turning mirror.

7. The device of claim 5 wherein the projector located in the lens does not protrude beyond a front surface or a back surface of the lens.

8. The device of claim 1 wherein the projectors are not visible to an outside observer when the eyeglasses are worn by the user.

9. The device of claim 1 wherein every projector has a length of not more than 3 mm.

10. The device of claim 1 wherein every projector has a maximum lateral size of not more than 3 mm.

11. The device of claim 1 wherein at least one projector comprises:
an image source;
a convex secondary mirror facing the image source, wherein image-forming rays from the image source are incident on and reflected by the secondary mirror;
a concave primary mirror facing the secondary mirror and further reflecting the image-forming rays from the secondary mirror, the secondary mirror and primary mirror cooperating to project the image from the image source; and
a solid transparent substrate with the primary mirror on one end of the substrate and with the secondary mirror on an opposite end of the substrate.

12. The device of claim 1 wherein the display windows are arranged as a two-dimensional array.

13. An eyeglass-integrated display device comprising:
eyeglasses comprising an eyeglasses frame and lenses mounted in the eyeglasses frame, wherein the eyeglasses frame comprises a rim;
at least two projectors embedded in a top of the rim, wherein the projectors do not protrude beyond an exterior edge of the rim; and
at least four display windows arranged as a two-dimensional array in the superior/inferior and nasal/temporal dimensions in one of the lenses, wherein each projector is optically coupled through the lens to only a single vertical row of at least two of the display windows, each projector generates an image that is a portion of a common image and projects the image directly into the lens and towards the vertical row of display windows through an edge of the lens without any turning mirror, and the display windows direct the images from the projectors towards a user's eye.

14. The device of claim 13 wherein each projector is optically coupled to not more than 5 display windows.

15. The device of claim 13 wherein the eye box for the device fills a center of the user's field of view.

16. An eyeglass-integrated display device comprising:
eyeglasses comprising an eyeglasses frame, and lenses mounted in the eyeglasses frame;
at least two projectors embedded in the eyeglasses, wherein every projector has a length of not more than 3 mm and a maximum lateral size of not more than 3 mm; and at least four display windows positioned at different locations in the superior/inferior and nasal/temporal dimensions in one of the lenses, wherein each projector is optically coupled through the lens to at least two and not more than five of the display windows, each projector generates an image that is a portion of a common image and the display windows direct the images from the projectors towards a user's eye, and the eye box for the device occupies a peripheral region of the user's field of view.

17. The device of claim 16 further comprising:
eye tracking sensors mounted on the eyeglasses.

18. The device of claim 17 wherein the projectors are powered on and off based on eye tracking of the user's eye.

19. The device of claim 16 wherein the lens comprises waveguide optics for optically coupling images from the projectors to the display windows.

20. The device of claim 19 wherein the display windows comprise at least one of a volume holographic grating, a surface relief grating, and a polarization volume grating.

21. The device of claim 16 further comprising:
communications and power electronics mounted on the eyeglasses, coupled to provide image data and power to the projectors.

* * * * *